3,310,467
STABILIZED METHYLCARBAMATE INSECTICIDES

Sherman F. Kramer and Jack K. Dale, Kalamazoo, Mich., assignors to The Upjohn Company, Kalamazoo, Mich., a corporation of Delaware
No Drawing. Filed June 29, 1964, Ser. No. 379,008
10 Claims. (Cl. 167—42)

This invention pertains to a novel improvement in formulating methylcarbamate insecticides, and to the novel, improved compositions thus obtained. The invention is more particularly directed to the use of free-flowing, hydrophobic starch for improving the stability of methylcarbamate insecticides in dust formulations, and to dust formulations consisting essentially of about 0.25% to about 10% of a methylcarbamate insecticide and a carrier diluent comprising at least 50% free-flowing, hydrophobic starch.

Numerous methylcarbamates are now well-known for their superior insecticidal properties, and several of them are commercially available for control of insect pests. For purposes of describing the improvement and improved compositions of this invention, representative insecticidal methylcarbamates include 6-chloro-3,4-xylyl methylcarbamate, 2-chloro-5-tert-butylphenyl methylcarbamate, 6-chloro-3-isopropylphenyl methylcarbamate, 3,4-methylenedioxyphenyl methylcarbamate, 2-isopropoxyphenyl methylcarbamate, 3,5-dimethyl-4-dimethylaminophenylcarbamate, 3-sec-butylphenyl methylcarbamate, 3-(1-methylpentyl)-phenyl methylcarbamate, 6-chloro-3-tert-amylphenyl methylcarbamate, 3,5-dimethyl-4-methyl-mercaptophenyl methylcarbamate, α-naphthyl methylcarbamate, 3,4,5-trimethylphenyl methylcarbamate, as well as the other 2-halo- and 2,4-dihalo-5-alkylphenyl methylcarbamate insecticides described in U.S. Patent No. 3,131,215; the other 3-alkyl-substituted p-aminophenyl and p-alkylaminophenyl methylcarbamates described in U.S. Patent No. 3,084,098; the other alkoxylphenyl methylcarbamates described in British Patent No. 894,004; the other aryl methylcarbamates described in U.S. Patent No. 3,084,096; the cyclic terpene methylcarbamates described in U.S. Patent No. 3,125,525; the 3-dimethylamino-4-methylphenyl methylcarbamate and 4-dimethylamino-3-methylphenyl methylcarbamate described in U.S. Patent No. 3,134,806; and the methylcarbamates described in Kolbezen et al., J. Ag. and Food Chem., 2, pp. 864–870 (1954).

The methylcarbamate insecticides, like other esters, are inherently more or less unstable because the ester linkage is cleaved by hydrolytic reaction. When significant hydrolysis occurs in insecticidal formulations comprising a methylcarbamate, the formulation is less potent than originally, and the byproducts of the hydrolysis are undesirable contaminants.

Dust formulations of insecticides are usually thought of as being relatively stable, because the material appears dry and the carrier diluent is usually considered to be inert. However, dust carrier diluents do contain free moisture, and in their finely-divided forms provide a relatively enormous surface area per unit of mass. Thus, the presence of free moisture and the relatively enormous surface areas for adsorption, contact catalysis, and other surface phenomena tend to promote hydrolysis of methylcarbamate insecticides. Hence, finely-divided carriers and diluents are known to "have a vital bearing on the potency and efficiency of a pesticide dust or spray, . . .". [See Grim, R. E., Applied Clay Mineralogy, p. 389, also pp. 307, 309, 309, 315–318, and 390–391, McGraw-Hill, New York (1962).]

It is recognized that some methylcarbamate insecticides are hydrolyzed more readily than others [see Dittert, Louis W., and Takeru Higuchi, J. Pharm. Sci., 52, pp. 852–857 (1963), and Casida, John E. et al., J. Ec. Ent., 53, pp. 205–212 (1960)], and the advantages of this invention are particularly pertinent to the 2-halo- and 2,4-dihalo-5-alkylphenyl methyl- and ethylcarbamates of U.S. Patent No. 3,131,215, and even more particularly pertinent to 2-halo-4,5-dialkylphenyl methylcarbamate.

In accordance with the invention, it has now been found that methylcarbamate insecticides subject to hydrolytic degradation in dust formulations are stabilized when a major proportion (at least about 50%) of a free-flowing, hydrophobic starch is incorporated in the formulation.

Starch modified so as to be free-flowing and resistant to water-wetting is apparently so constituted in respect of its surface chemistry that the problem of hydrolytic degradation is resolved. Free-flowing, hydrophobic starch provides superior dust formulations of enhanced shelf-life, dispersibility, and hydrophobic properties.

Free-flowing, hydrophobic starches suitable for formulation in accordance with the improved compositions of this invention are prepared according to the procedures described in U.S. patents, No. 2,613,206, No. 2,614,945, No. 2,961,339, and No. 3,071,492. Any of the free-flowing hydrophobic starches prepared according to the foregoing U.S. patents are satisfactory. A preferred free-flowing, hydrophobic starch is one prepared according to the procedure described in U.S. Patent No. 2,613,206.

Advantageously, a free-flowing, hydrophobic starch according to U.S. Patent No. 2,613,206 is prepared by treating ungelatinized starch with, for example, about 2% to about 3% 1-octenyl succinic anhydride in the presence of a base, for example, sodium hydroxide, sodium carbonate, trisodium phosphate, pyridine, and the like; and neutralizing the starch acid ester thus formed with, for example, aluminum sulfate. A free-flowing hydrophobic starch thus prepared having a pH of 4.5 to 5.5 (1 part starch to 4 parts distilled water), about .7% ash, and water repellency of 6 ml. or less is milled so that all of the particles will pass through a 100 mesh U.S. Standard screen and 99.5% will pass through a 150 mesh screen. A particularly preferred form of free-flowing, hydrophobic starch has the foregoing specifications.

It is known that such free-flowing, hydrophobic starches possess superior dispersing and hydrophobic properties, but it was not known that they would protect methylcarbamate insecticides from hydrolytic degradation in dust formulations.

The magnitude of the problem of hydrolytic degradation can be recognized from the results of a comparative experiment with some well-known carrier diluents. A representative methylcarbamate (6-chloro-3,4-xylyl methylcarbamate) was formulated in 1% concentration with representative finely-divided carrier diluents, i.e., talc, a diatomaceous earth, and a kaolinite clay. The test formulations were stored in screw-cap bottles at 56° C. and 50% relative humidity. After only 2 weeks, the talc formulation had lost 86% of its original activity; the kaolinite clay formulation had lost 73% of its original activity; and the diatomaceous earth formulation had lost 24% of its original activity. The conditions of storage were drastic; but under such conditions, the problem of hydrolysis is merely accelerated and differences are more apparent.

The unexpected property of stabilizing methylcarbamate insecticides in dust formulations is clearly demonstrated by the examples that describe in detail the improvement of this invention. The following examples are illustrative of the process and products of the present invention, but are not to be construed as limiting.

PREPARATION 1

A free-flowing, hydrophobic starch is prepared according to the procedure of U.S. Patent No. 2,613,206 by suspending 500 lbs. corn starch in 94 gals. water basified with 25 lbs. sodium carbonate. The basified starch suspension is thoroughly stirred while 15 lbs. of 1-octenyl succinic anhydride is added. After continued stirring of the reaction mixture for about 12 hrs. at about 25° C., 10 lbs. of aluminum sulfate is added. Thorough stirring is continued for an additonal 4 hrs. at about 25° C. Specification grade free-flowing, hydrophobic starch is obtained by filtering, washing, and drying.

Example 1

A dust formulation consisting of 1% 6-chloro-3,4-xylyl methylcarbamate and the balance a free-flowing, hydrophobic starch prepared in the same manner as Preparation 1, above, was stored in screw cap bottles at 56° C. and 50% relative humidity for 2 weeks. The amount of 6-chloro-3,4-xylyl methylcarbamate was determined by chemical assay to be 90% of that originally present. Under the drastic conditions of high temperature storage, this order of stability is satisfactory.

Example 2

A dust formulation consisting of 0.8 g. of a mixture of about 60% 6-chloro-3,4-xylyl methylacarbamate and about 40% 2-chloro-3,4-xylyl methylcarbamate was thoroughly mixed with 99.2 g. of the free-flowing, hydrophobic starch prepared in the same manner as Preparation 1, above. After storage for 18 mo. in screw-cap bottles at 25° C., there was determined to be, by chemical assay, about 92% of the original methylcarbamates.

A second test formulation prepared and stored in the same manner contained, after 24 months, about 93% of the original compounds.

Example 3

A dust formulation consisting of 0.8 g. of 6-chloro-3,4-xylyl methylcarbamate was thoroughly mixed with 99.2 g. of free-flowing, hydrophobic starch (prepared in the same manner as Preparation 1, above) and stored at 25° C. After 12 months, chemical assay for 6-chloro-3,4-xylyl methylcarbamate established that the formulation still contained 97% of the original active ingredient.

Following the same procedure, but utilizing 1%, 5%, and 10% 6-choloro-3,4-xylyl methylcarbamate with the free-flowing, hydrophobic starch carrier diluent, the decreases in amount of active ingredient were of the same order of magnitude, and stability of the 6-chloro-3,4-xylyl methylcarbamate was satisfactory.

Example 4

Another dust formulation was prepared by mixing 10 g. of 6-chloro-3,4-xylyl methylcarbamate with 495 g. of finely-divided pyrophyllite and 495 of a free-flowing, hydrophobic starch prepared in the same manner as Preparation 1, above. After storage for 12 months in screw-cap bottles at 25° C., chemical assay for 6-chloro-3,4-xylyl methylcarbamate established that about 95% of the active ingredient was still present in the formulation.

Following the same procedure but replacing the 495 g. of pyrophyllite with 247.5 g. of finely-divided bentonite clay and utilizing 742.5 g. of the free-flowing, hydrophobic starch, there was prepared a dust formulation having satisfactory dusting properties and about 96% of the original active ingredient after storage for 12 months at 25° C.

Example 5

Following the procedure of Example 3, but substituting 2-chloro-5-tert-butylphenyl methylcarbamate, 6-chloro-3-isopropylphenyl methylcarbamate, 2-isopropoxyphenyl methylcarbamate, 3,5-dimethyl-4-dimethylaminophenyl methylcarbamate, 3-sec-butylphenyl methylcarbamate, α-napthyl methylcarbamate, 2,4-dichloro-3,5-dimethylphenyl methylcarbamate, 2,4-dichloro-3-methyl-5-ethylphenyl methylcarbamate, 6-chloro-3-tert-amylphenyl methylcarbamate, and 2,4-dichloro-5-methylphenyl methylcarbamate for 6-chloro-3,4-xylyl methylcarbamate, dust formulations of the enumerated methylcarbamate insecticides having improved stability were obtained.

From the foregoing detailed description of specific embodiments of this invention, it will be understood that formulations of free-flowing, hydrophobic starch and methylcarbamate insecticides may comprise various low concentrations of the active ingredient and a carrier diluent comprising from about 50% to substantially all free-flowing, hydrophobic starch. A preferred range of "low-concentrations" is from about 0.25% to about 10%. The particular concentration to be used will of course depend upon factors such as the potency of the methylcarbamate insecticide, the insect pest to be controlled, the means of application, and the conditions of treatment. Practical experience has indicated, however, that the improvement of the invention is more significant at concentrations of about 1% to about 5% than at concentrations of 10%, and at the former concentrations it is advantageous to utilize proportions of free-flowing, hydrophobic starch in the carrier diluent approaching the upper ranges of about 75% to 100%.

Any of the great variety of dust carrier diluents can be used along with the designated at least 50% proportion of free-flowing, hydrophobic starch. Representative carrier diluents include attapulgite, kaolinite, montmorillonite, pyrophyllite, diatomite, wood and walnut shell flours, other starches, and the like. The mechanics of formulating the methylcarbamate insecticide and the carrier diluent of this invention comprising at least 50% free-flowing, hydrophobic starch is within the skill of the art and any of the conventional procedures can be employed.

We claim:

1. The method of controlling pestiferous insects which comprises contacting live, pestiferous insects with an insecticidally effective amount of stabilized methylcarbamate insecticide in a composition comprising at least 50% free-flowing, hydrophobic starch and from about 0.25% to about 10% of the methylcarbamate.

2. The method of controlling pestiferous insects which comprises contacting live, pestiferous insects with an insecticidally effective amount of stabilized substituted-phenyl methylcarbamate insecticide in a composition comprising at least 50% free-flowing hydrophobic starch and from about 0.25% to about 10% of the substituted-phenyl methylcarbamate.

3. The method of controlling pestiferous insects which comprises contacting live, pestiferous insects with an insecticidally effective amount of stabilized 2-halo and 2,4-dihalo-5-alkylphenyl methylcarbamate insecticide in a composition comprising at least 50% free-flowing, hydrophobic starch and from about 0.25% to about 10% of a substituted-phenyl methylcarbamate insecticide selected from the group consisting of 2-halo-5-alkylphenyl methylcarbamate insecticide and 2,4-dihalo-5-alkylphenyl methylcarbamate.

4. The method of controlling pestiferous insects which comprises contacting live, pestiferous insects with an insecticidally effective amount of stabilized 2-halo-4,5-dialkylphenyl methylcarbamate insecticide in a composition comprising at least 50% free-flowing, hydrophobic starch and from about 0.25% to about 10% of the 2-halo-4,5-dialkylphenyl methylcarbamate.

5. The method of controlling pestiferous insects which comprises contacting live, pestiferous insects with an insecticidally effective amount of stabilized 6-chloro-3,4-xylyl methylcarbamate insecticide in a composition comprising at least 50% free-flowing, hydrophobic starch and from about 0.25% to about 10% of the 6-chloro-3,4-xylyl methylcarbamate.

6. Composition comprising about 0.25% to about 10% of a methylcarbamate insecticide and a carrier diluent comprising at least 50% free-flowing, hydrophobic starch.

7. Composition comprising about 0.25% to about 10% substituted-phenyl methylcarbamate insecticide and a carrier diluent comprising at least 50% free-flowing hydrophobic starch.

8. Composition comprising about 0.25% to about 10% of a substituted-phenyl methylcarbamate insecticide selected from the group consisting of 2-halo-5-alkylphenyl methylcarbamate insecticide and 2,4-dihalo-5-alkylphenyl methylcarbamate insecticide and a carrier diluent comprising at least 50% free-flowing, hydrophobic starch.

9. Composition comprising about 0.25% to about 10% of 2-halo-4,5-dialkylphenyl methylcarbamate insecticide and a carrier diluent comprising at least 50% free-flowing, hydrophobic starch.

10. Composition comprising about 0.8% 6-chloro-3,4-xylyl methylcarbamate and a carrier diluent consisting essentially of free-flowing, hydrophobic starch.

References Cited by the Examiner
UNITED STATES PATENTS

| | | | |
|---|---|---|---|
| 2,613,206 | 10/1952 | Caldwell | 260—233.5 |
| 3,131,215 | 4/1962 | Lemin | 260—479 |

ALBERT T. MEYERS, *Primary Examiner.*

JEROME D. GOLDBERG, *Assistant Examiner.*